(12) United States Patent
Rudi et al.

(10) Patent No.: US 7,500,633 B1
(45) Date of Patent: Mar. 10, 2009

(54) TAPE REEL HUB WITH LEADER PIN ALIGNMENT

(75) Inventors: Guttorm Rudi, Fielhamar (NO); Bjarte Jegerstedt, Oslo (NO)

(73) Assignee: Tandberg Storage ASA, Lysaker (NO)

( * ) Notice: Subject to any disclaimer, the term of this patent is extended or adjusted under 35 U.S.C. 154(b) by 0 days.

(21) Appl. No.: 11/969,559

(22) Filed: Jan. 4, 2008

(51) Int. Cl.
*B65H 19/28* (2006.01)

(52) U.S. Cl. .................................. 242/532.6; 242/332.8

(58) Field of Classification Search .............. 242/332.4, 242/332.7, 332.8, 532.1, 532.6, 532.7; 360/132, 360/95
See application file for complete search history.

(56) References Cited

U.S. PATENT DOCUMENTS

| | | | | |
|---|---|---|---|---|
| 4,477,851 A | * | 10/1984 | Dalziel et al. | ............ 242/332.7 |
| 4,709,873 A | * | 12/1987 | Smith et al. | ............... 242/332.8 |
| 4,742,407 A | * | 5/1988 | Smith et al. | ............... 242/332.8 |
| 6,364,232 B1 | * | 4/2002 | Nemeth et al. | ........... 242/332.7 |
| 6,626,387 B1 | * | 9/2003 | Hamming | ................. 242/332.8 |
| 6,719,231 B2 | * | 4/2004 | Hiraguchi | ................ 242/332.8 |
| 2004/0129817 A1 | * | 7/2004 | Hamming | ................ 242/332.8 |

* cited by examiner

*Primary Examiner*—William A Rivera
(74) *Attorney, Agent, or Firm*—Schiff Hardin LLP

(57) ABSTRACT

A take-up reel for a single reel cartridge magnetic tape recording and playback apparatus includes a reel assembly with upper and lower flanges and a central hub. A leader pin gripper is formed to engage a leader pin at a free end of the magnetic tape on the cartridge and is movable along a tape transport path and into an inserted position in a slot in the central hub of the take-up reel. The leader pin gripper is movable to a fully inserted position within the hub core when engaged with the leader pin of the magnetic tape. When in the fully inserted position, the leader pin gripper is secured in this position by roller arms in the hub that engage a wedge on the gripper and by a magnet mounted either in the hub or the gripper that magnetically engages a magnet or a plate in the other of the gripper or the hub. The gripper is held at reference surfaces defining a predetermined position of the leader pin hook. The leader pin is also pressed into a defined axial position by a leaf spring having a ramp at the free end thereof.

12 Claims, 14 Drawing Sheets

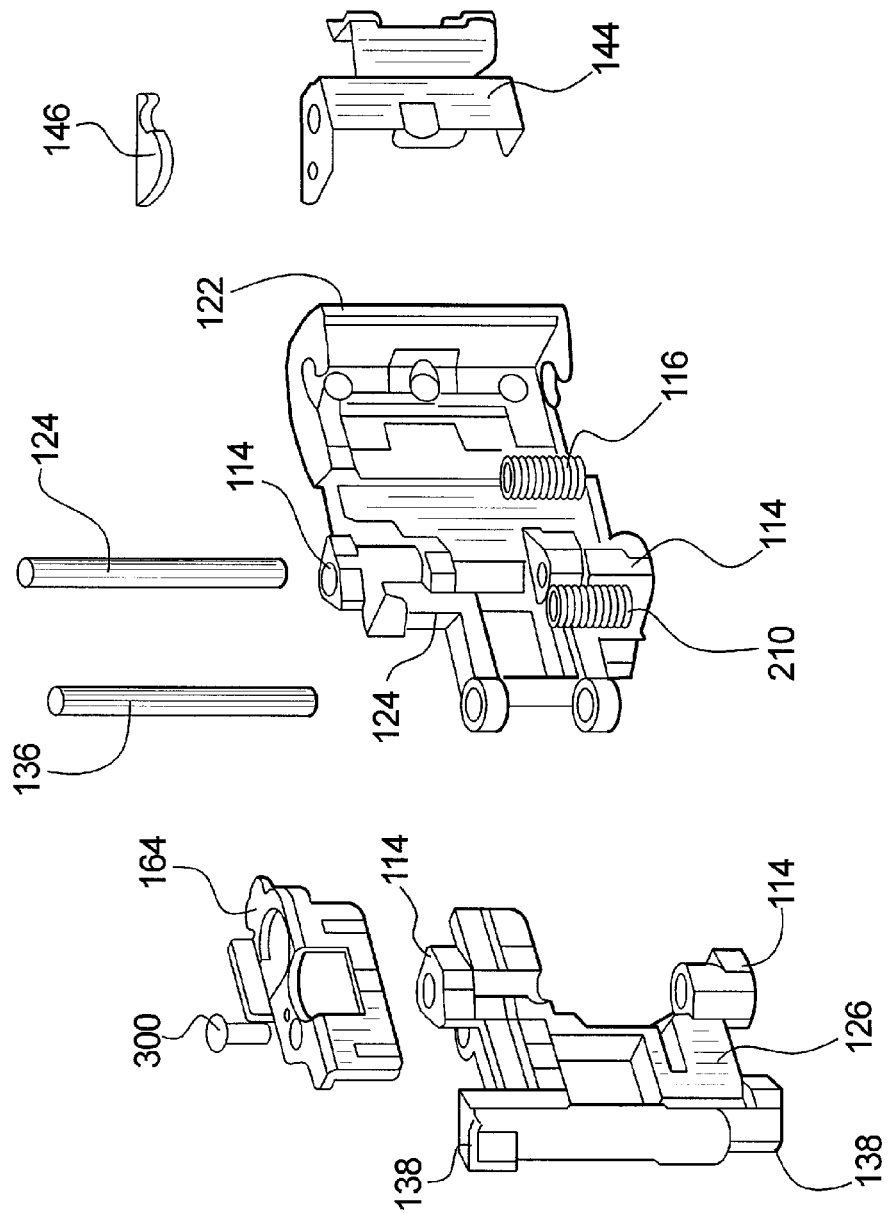

TAPE REEL HUB WITH LEADER PIN ALIGNMENT

BACKGROUND OF THE INVENTION

1. Field of the Invention

The present invention relates generally to a magnetic tape recording apparatus and, in particular, to an apparatus for extracting an end of a magnetic tape and for engaging the tape end in a take-up reel of a tape drive.

2. Description of the Related Art

Magnetic recording using tapes stored in cartridges or cassettes is well known and a variety of cartridges and cassettes have been provided. In many tape cartridges, the magnetic tape on which data or other information is magnetically stored and retrieved is wound from a first spool to a second spool inside the cartridge. Single reel tape cartridges are also known in which the cartridge contains only a single spool or reel and the magnetic recording tape is wound onto this single reel or spool for storage. When a single reel cartridge is inserted into a tape drive, a free end of the magnetic tape is engaged by the tape drive and carried to a take-up reel or spool in the tape drive. The take-up reel or spool in the tape drive draws the magnetic recording tape out of the cartridge and onto the take-up reel as the magnetic tape is unwound from the single reel in the cartridge. The magnetic recording tape is wound and unwound between the two spools or reels, the reel in the cartridge and the take-up reel in the drive.

In order to permit the tape drive to engage the free end of the magnetic recording tape in a single reel cartridge, the free end of the tape is provided with a leader pin. The leader pin is connected in a suitable manner to the recording tape so that the longitudinal axis of the leader pin is parallel to the transverse direction of the magnetic recording tape and perpendicular to the direction along which the tape will transfer between the cartridge reel and the take-up reel in the drive. The leader pin has opposite ends which project beyond the width of the recording tape, these ends being received in respective recesses in the cartridge at a tape access opening so that the leader pin may be engaged by a gripping mechanism in the tape drive.

The leader pin gripping and extracting mechanisms are provided in a variety of configurations for engaging the free end of the recording tape and pulling the leader pin and recording tape connected thereto into the drive for engagement with the take-up reel. One such engagement mechanism is shown in U.S. Pat. No. 6,908,055 B2. As noted in this patent, the reliability of the extraction system to accurately thread the tape onto the take-up reel for winding and unwinding between the two reels is critical to the operation of the tape drive since the magnetically recorded tracks on the tape are parallel to one another and are closely packed with one another. In the above-noted U.S. Pat. No. 6,908,055 B2 is shown a reel 3 driven by a motor and gear system, the reel 3 having a lever arm 5 with a pin 34 that engages a gripper assembly 21 to move the gripper assembly into engagement with the leader pin of the tape and draw the gripper assembly along a tape guide for engagement in a take-up reel.

In a take-up reel of a single reel cartridge tape drive, irregularities in the tape contact surface of the take-up reel hub create unwanted tape speed variations and lateral tape movement. Slots in the hub of the take-up reel reduce the stiffness of the take-up reel so that tension forces as a result of the tape tension on the take-up reel result in deflection of the hub which in turn results in deformation of the hub flanges. The deformation of the hub flanges can cause an increase in the run-out angle of the hub flanges and thus an undesirable lateral movement of the magnetic recording tape. If the deformation of the hub flanges results in contact between the edge of the magnetic recording tape and the hub flange, an undesirable lateral movement of the tape results.

SUMMARY OF THE INVENTION

The present invention provides a take-up reel for a magnetic recording device for use with a single reel cartridge in which the take-up reel in the magnetic recording device includes a gripper mechanism for engagement with the free end of the magnetic recording tape, the gripper mechanism being received in a hub core of the take-up reel to provide a tape contact surface of the hub with a minimum of irregularities and radial run-out when the gripper mechanism is fitted into place in the hub core.

The present invention also provides a tape leader pin pull-in system for drawing the leader of the magnetic recording tape into the hub core into a predefined position while simultaneously providing sufficient clearance to provide jam-free movement of the tape leader pin gripper into and out of its position in the hub core of the take-up reel.

The present invention also provides a tape leader pin gripper having sufficient seating force in the hub core of the take-up reel to withstand pull-out forces caused by tape tension during the start of tape winding on the take-up reel.

Embodiments of the present invention provide a tape contact surface on the hub core of the take-up reel of a single reel cartridge magnetic recording system in which the flanges on the hub core are provided with run-out tolerances which avoid significant tape contact even when subject to distortion due to forces created by layers of tape wound on the hub core of the take-up reel.

The present invention also provides take-up reel hub flanges in a single reel cartridge magnetic recording system structured to provide substantially distortion free winding of all tape layers onto the hub core.

These and other advantages of the embodiments of the present invention are provided by a take-up reel for a single reel cartridge in a magnetic recording medium apparatus in which the take-up reel has separate upper and lower flange parts and a separate hub core part. The hub core is formed by a core insert part and an over-mold part which provides the tape contact surface as the tape is wound on the hub. A slot in the hub core receives a tape leader pin gripper assembly so that the gripper assembly securely engages the leader pin in the hub core while a portion of the gripper assembly fills the slot in the hub core when the gripper assembly is at a predetermined position. When the leader pin gripper assembly fits into the slot of the hub core, it is held in the predetermined position by a pair of spring biased arms in the hub, the spring biased arms engaging a pull-in wedge of the gripper assembly so that the gripper is moved to the predetermined position.

In a preferred embodiment, either the tape leader gripper assembly or the hub core includes a magnet that exerts a magnetic force holding the gripper assembly in place to resist pulling forces by the tape. The magnet can be in the tape leader gripper assembly to magnetically engage a complimentary magnet in the hub core, the magnet can be in the tape leader gripper assembly to magnetically engage a non-magnetic metal element in the hub core, or the magnet can be in the hub core to magnetically engage a non-magnetic metal element in the tape leader gripper assembly. With any of these alternatives the gripper assembly is urged into the desired position.

BRIEF DESCRIPTION OF THE DRAWINGS

FIG. 14 is an exploded view of the gripper assembly from the direction of FIG. 12.

DETAILED DESCRIPTION OF THE PREFERRED EMBODIMENTS

A preferred embodiment of the present invention provides a take-up reel for use in a tape drive that utilizes single reel magnetic tape cartridges. Single reel magnetic tape cartridges may be provided in a variety of formats and a common type of format is the so-called LTO (linear tape open) tape cartridge in which a free end of the tape is provided with a tape leader pin that is held at an open portion of the cartridge until it is grasped by a tape threading mechanism and drawn onto a take-up reel. Such single reel tape cartridges are well known to those of skill in the art. The present take-up reel includes a number of features, in the preferred embodiment, that improves the performance of the magnetic recording and playback device which uses single reel tape cartridges.

The magnetic recording and playback device includes well known features including a housing with a cartridge slot for receiving the tape cartridge, drive motors for moving the tape, a read/write head for reading and writing the magnetic data on the tape, and control and communication electronics as needed. The magnetic recording and playback device includes a take-up reel as shown below onto which the tape is wound from the single reel cartridge.

Figure 1:
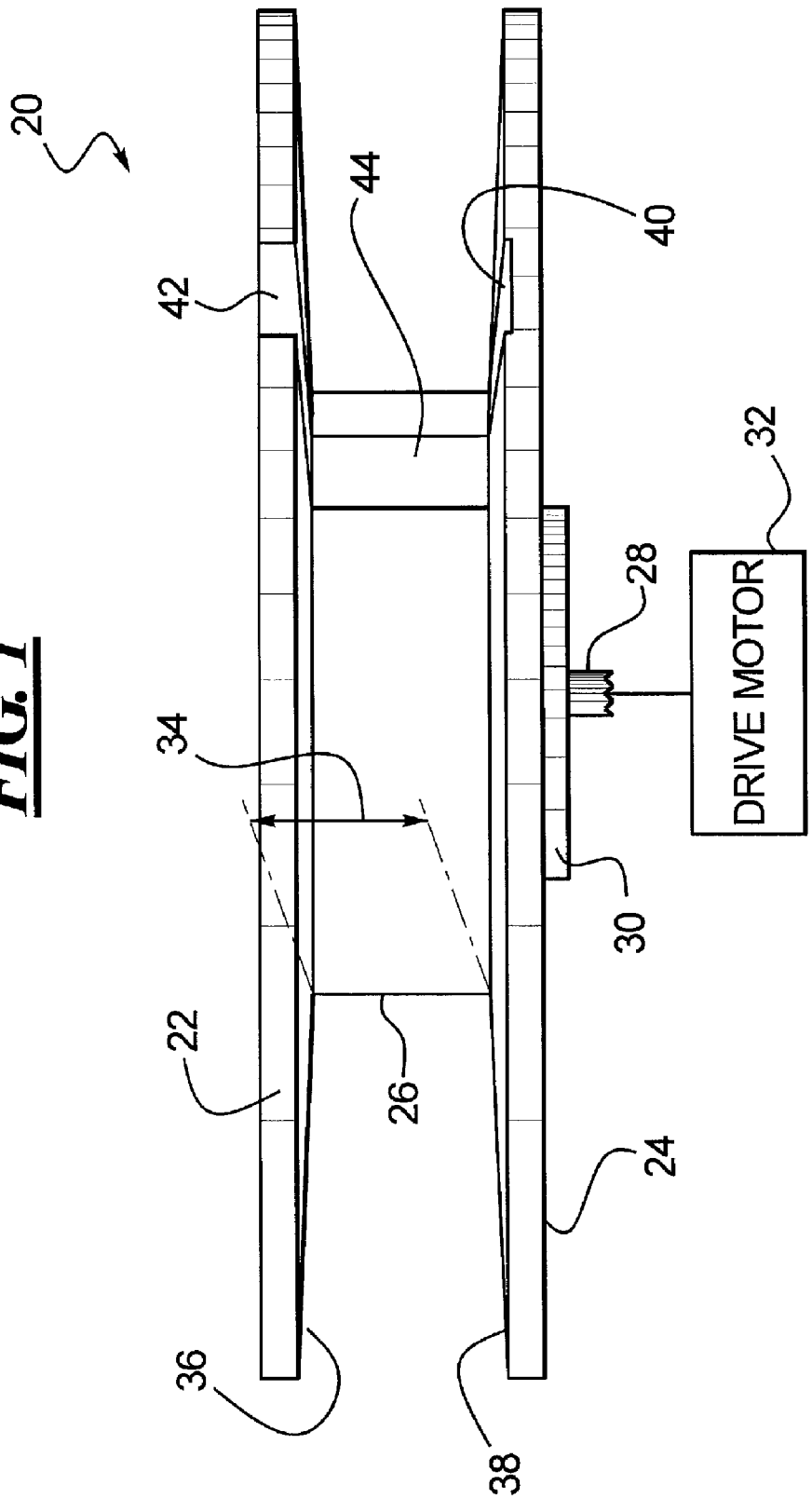
FIG. 1 is a side elevational view of a take-up reel of a single reel cartridge tape drive according to the principles of the present invention.
Figure 2:
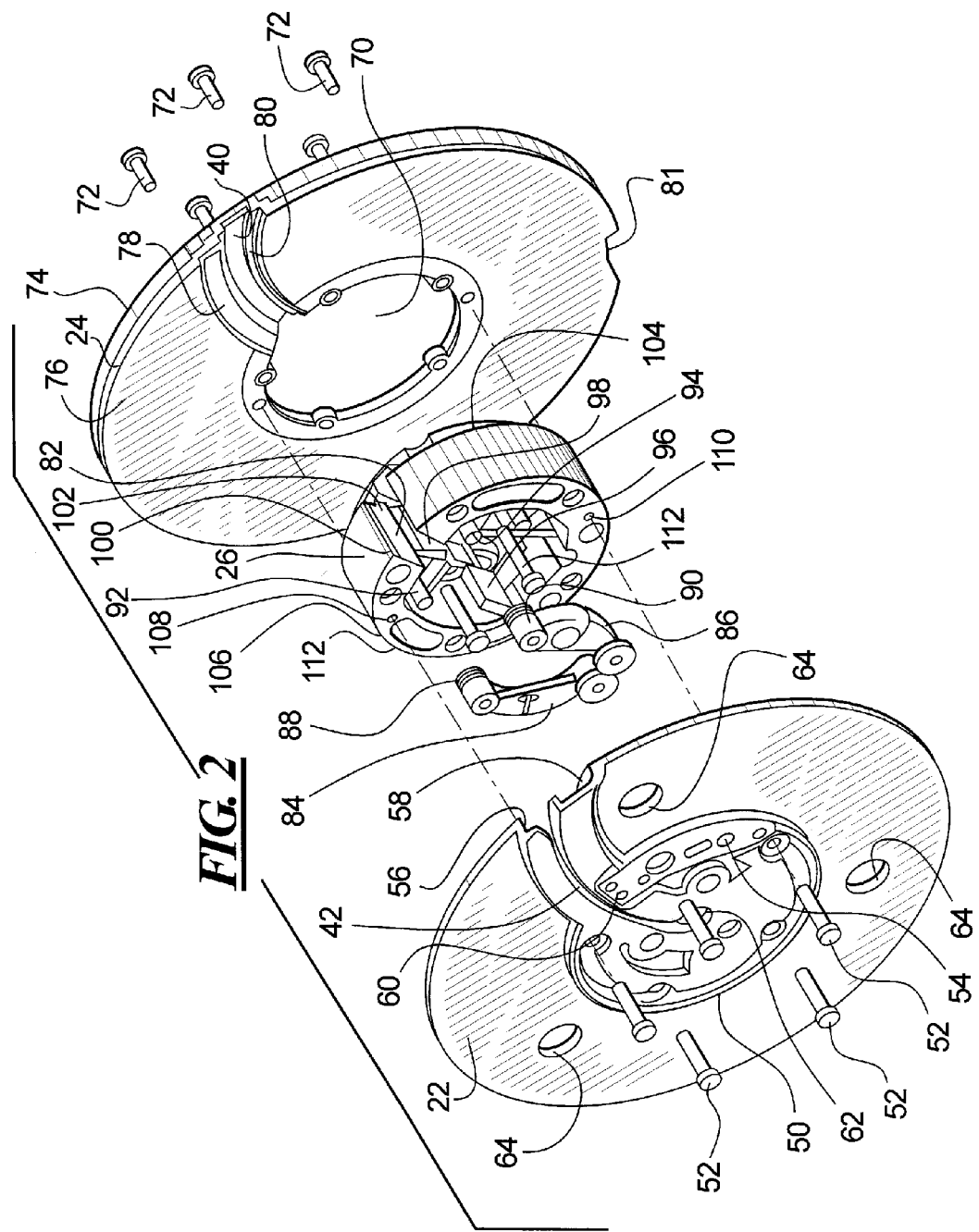
FIG. 2 is an exploded perspective view of the take-up reel of FIG. 1 showing a reel hub and roller arms.
Figure 9:
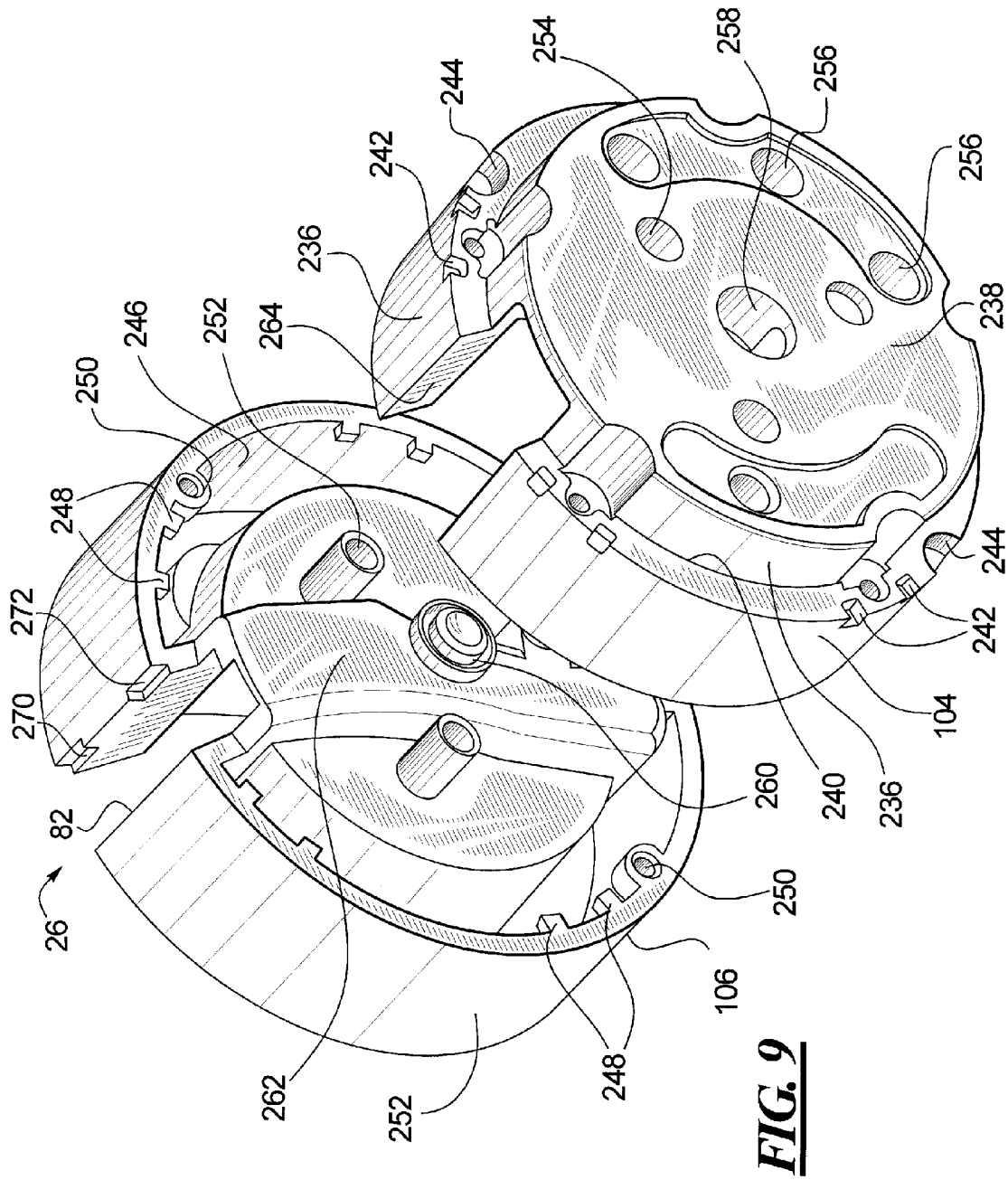
FIG. 9 is an exploded perspective view of the hub core of the take-up reel showing an insert portion and an over-mold portion of the hub.

With reference first to FIG. 1 of the drawings, a take-up reel 20 for use in a tape drive for single reel cartridges is shown in side view and includes a top flange 22, a bottom flange 24, and a hub 26. The flanges 22 and 24 and the hub 26 of a preferred embodiment are of separate parts, although an alternative embodiment provides that two or more of the parts are formed together. The take-up reel 20 is mounted to a motor reference surface by three screws 112 (as shown in FIG. 2). The reference surface on the hub core is the floor 238 (as shown in FIG. 9). The lower flange 24 also includes a surface 30. A drive motor 32 drives the take-up reel 20. The hub 26 has a height corresponding to the flange-to-flange distance, as indicated by arrow 34. The flanges 22 and 24 have tapered or sloping inner surfaces facing one another, designated at 36 and 38, respectively. The flange surfaces 36 and 38 are angled at a flange slope angle so that the space between the flanges 22 and 24 gradually widens from the flange-to-flange distance 34 at the hub. This is referred to as run-out. In one embodiment, the run-out angle is approximately one degree. The flange slope angle accommodates distortion in the flange position while avoiding contact with the tape edges which would tend to shift the magnetic tape from its preferred position.

As is well understood by those of skill in the art of magnetic tape recording, the magnetic tape is wound from the single reel cartridge onto the surface of the hub core 26 in an ever increasing depth as the wound tape fills the space between the flanges 22 and 24. The take-up reel 20 is rotated in a winding direction for winding of the tape, and is rotated (or permitted to rotate) in an opposite, unwinding direction for unwinding the tape from the take-up reel and back onto the single reel cartridge.

The lower flange 24 includes a guide channel 40 formed in the inner surface thereof and the upper flange 32 includes a guide channel 42 in it's inner surface. The guide channels 40 and 42 in the flanges 24 and 32 guide a tape leader pin from the periphery of the take-up reel to the hub 26. The tape leader pin at the free end of the magnetic recording tape is engaged by and held in a pin gripper assembly, the outer surface of which is designated here as 44 (and which is designated in its entirety as 120 in FIG. 3). The pin gripper assembly 44 seats fully into the hub 26 (as shown in greater detail in FIG. 6) to provide a constant radius hub surface on which the magnetic recording tape is wound.

Turning now to FIG. 2, the take-up reel 20 is shown in exploded view with the upper flange 22 separated from the hub 26 and the lower flange 24. The upper flange 22 has a generally disk-shaped configuration with a circular center portion 50 including openings for receiving mounting screws 52 for holding the upper flange 22 to the hub core 26 and the lower flange 24. Five such mounting screws are provided in the preferred embodiment. The center portion 50 of the upper flange 22 is also provided with a leaf spring 54 that in the preferred embodiment is affixed to the flange 22 by two plastic pins on the flange 22 that extend through corresponding openings in the leaf spring 54 and are melted at the ends thereof to provide a plastic weld for securing the leaf spring 54.

The upper flange 22 has the guide channel 42 including first and second parallel channel portions 56 and 58. The channel portion 56 includes a slot 60 through the disk-shaped flange 22 to provide access to the channel from above. The guide channels 56 and 58 as well as the slot 60 are generally arcuate in shape and extend from the outer peripheral edge of the disk-shaped flange 22 to the rotational center thereof at a central opening 62. Three openings 64 are provided in the flange 22 between the center portion 50 and the outer periphery.

The guide channels 56 and 58 are formed by a raised portion of the flange 22 extending above the body of the flange. Similarly, the central portion 50 includes a raised wall and additional shaping and openings to accommodate fasteners and the like of the preferred embodiment. The upper flange 22 of the preferred embodiment is formed of a plastic or plastic-like material although it may also be formed of metal or other materials.

The lower flange 24 is generally disk-shaped with an enlarged central opening 70. Adjacent the perimeter of the central opening 70 are a plurality of openings for receiving the threaded screws 52 and for providing connection between the threaded screws 52 to threaded bolts 72 that are mounted on the underside of the lower flange 24. Five such threaded bolts 72 are provided in the preferred embodiment. The lower flange 24 has a lower component 74 of metal and an upper component 76 of plastic in one preferred embodiment.

The channel 40 is formed in an arc across the upper surface of the upper component 76 and includes channel portions 78 and 80. The channel portions 78 and 80 do not extend through the lower flange but are closed by bottom surfaces. The arc-shaped channel 40 enables an arcuate movement of a leader pin pull in device such as shown in the prior U.S. Pat. No. 6,908,055, for example. Other shapes of channels may be provided instead. To accommodate the channel 40, the lower component 74 also includes a corresponding channel. A notch 81 is provided in the periphery of the lower flange 24. The notch 81 can be engaged by an alignment or rotation mechanism.

The hub core 26 includes a generally cylindrical body having an outer surface shaped to accept winding layers of the magnetic tape. In particular, the outer surface is smooth and even. The hub core 26 has a slot 82 for receiving a tape leader pin gripper. The tape leader pin gripper (44 in FIG. 1) completes the outer surface to fill the slot and form a smooth and even surface at the slot as well.

The hub core 26 provides a cylindrical outer wall in the middle or center of which is an area for accommodating and engaging the leader pin gripper assembly. This central portion of the hub core 26 has roller arm assemblies 84 and 86 which are biased into gripper engaging positions by torsion springs 88 and 90. The roller arms 84 and 86 are mounted for pivoting movement on roller arm pins 92 and 94 in the central portion of the hub core 26. A magnet 96 is provided in a magnet mounting groove in the plastic part of the central portion of the hub core 26. The magnet 96 is secured in the groove by glue. The magnet mounting portion includes a rotational reference surface 98 for the gripper hook which fits into the slot 82. Two alignment reference surfaces 100 and 102 are provided at the outer end of the slot 82 for alignment of the gripper hook.

The hub core is formed of a metal insert 104 over which is provided a plastic over-molding 106. The plastic over-molding 106 has alignment holes 108 and 110 for aligning the upper flange 22 with the hub core 26. Mounting screws 112 mount the hub core and thus the assembled take-up reel 20 to a drive motor mechanism 32 (as shown in FIG. 1). The drive motor may either be a direct drive motor or a motor operating through a drive train, such as via gears or belts, to drive the take up reel at a reduced speed relative to the motor speed.

Figure 3:
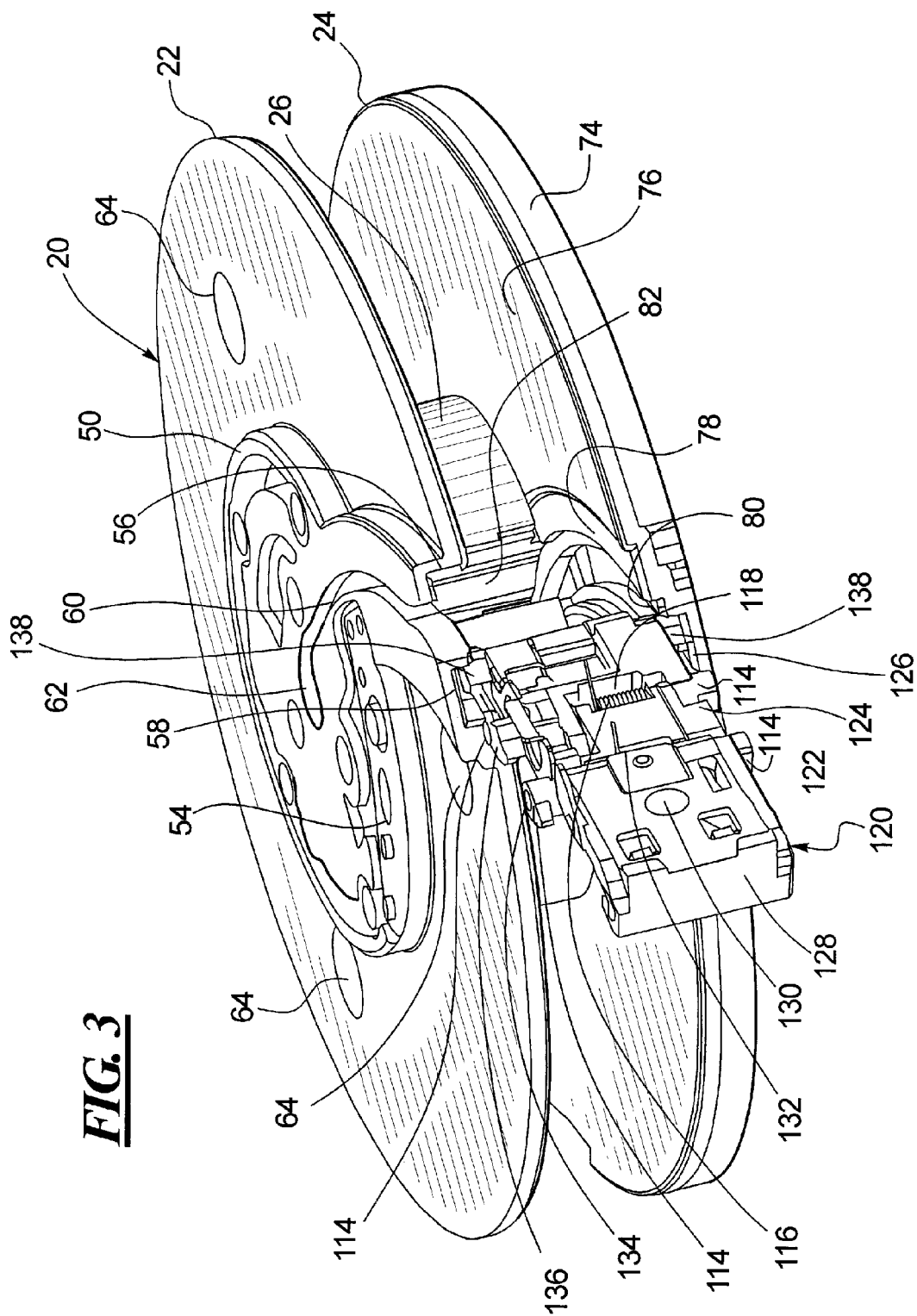
FIG. 3 is a perspective view of the take-up reel and showing a gripper assembly for engagement with a tape leader pin of a magnetic recording tape, the gripper moving into the take-up reel.

Turning now to FIG. 3, a perspective view of the assembled take-up reel 20 shows the upper flange 22 with three openings 64 in the disk-shaped body of the flange 22. The first and second parallel channel portions 56 and 58 extend above the disk-shaped body of the upper flange 22. Between the channel portions 56 and 58 is the slot 60. The slot 60 extends from the outer parameter of the disk-shaped upper flange 22 to the central opening 62. The center portion 50 of the upper flange 22 includes a perimeter wall therearound. The leaf spring 54 is apparent in the central portion 50 of the upper flange 22. The lower flange 24 includes the channel portions 78 and 80 that are formed both in the lower component 74 and upper component 76 along which the tape leader pin gripper is guided. The hub core 26 has the slot 82 at the inner end of the channel portions 78 and 80 for receiving the tape leader pin gripper.

The tape leader pin gripper assembly is shown in FIG. 3 generally as element 120. The tape leader pin gripper 120 includes a hook portion 122, a middle portion 124 and an end portion 126. It is also contemplated that the tape leader pin gripper could have more or fewer portions. The hook portion 122 includes an end face 128 that fits into the slot 82 of the hub core 26 to complete the outer surface of the hub core. In a preferred embodiment, the end face 128 fits into the slot 82 in a position to eliminate any substantial discontinuities, ridges, depressions, raised portions or other changes in shape from an ideal cylindrical tape winding surface on the hub core 26. The body of the hook portion 122 includes a cam projection 130 and a magnet plate 132.

The hook portion 122 is connected to the middle portion 124 of the gripper assembly by a pivot pin 134 that includes end caps 114 that serve as channel followers at both opposite ends thereof for movement along the guide channels 58 and 80. The end caps 114 serve as guides and may be mounted on the pivot pin 134 or on one or the other of the hook portion 122 and middle portion 124. A spring 116 is also provided on the pivot pin 134 to bias the rotation of the hook portion 122 relative to the middle portion 124.

The middle portion 124 and the end portion 126 are connected to one another by a second pivot pin 136 that also has end caps or guides 114 for movement along the guide channels 58 and 80. A bias spring 118 is also provided on the pivot pin 136 to provide pivot biasing of the middle portion 124 with the end portion 126. The end portion 126 includes a pull-in wedge 138 at both the top and bottom thereof for movement along the guide channels 58 and 80.

Figure 4:
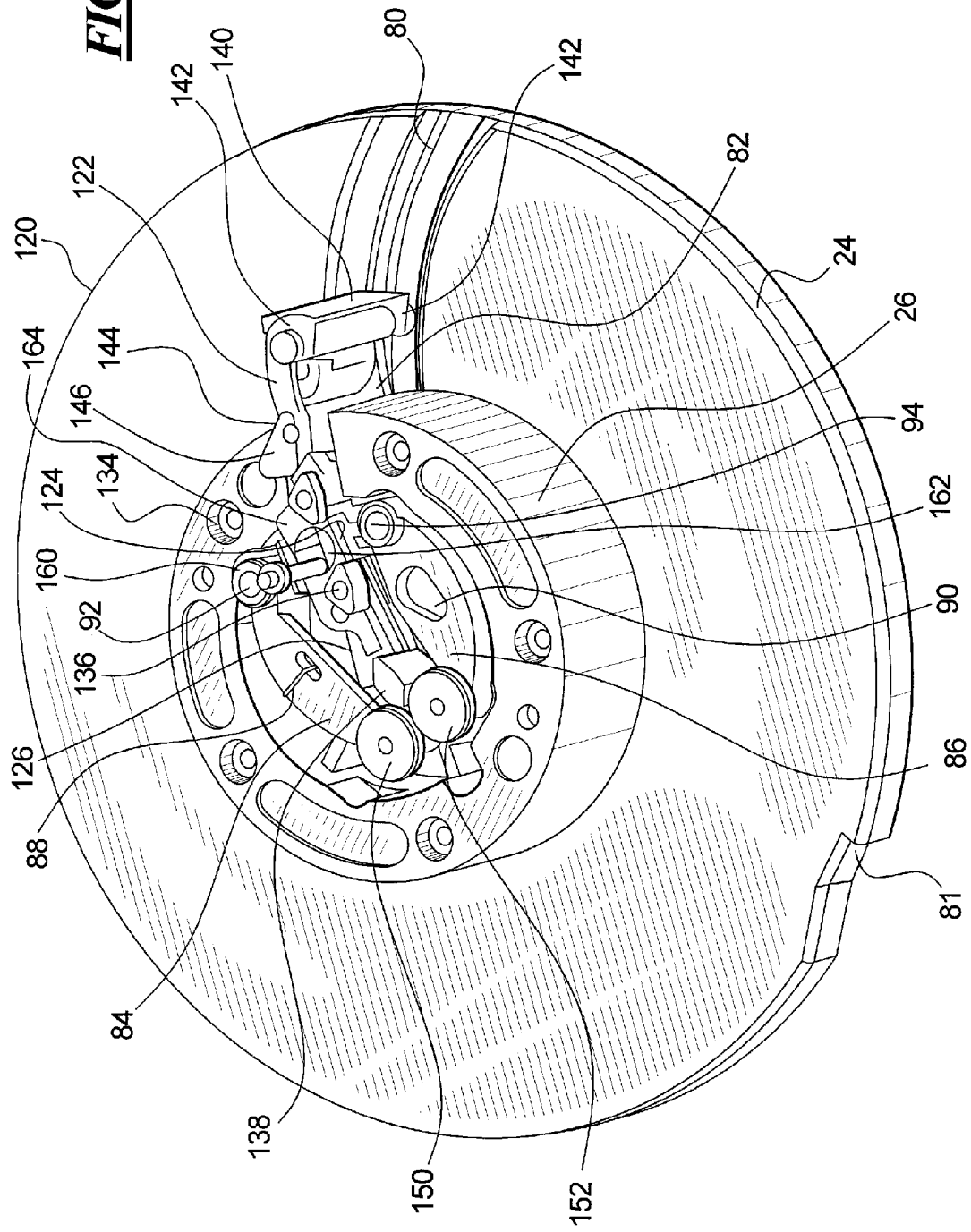
FIG. 4 is a top perspective view of the take-up reel of FIG. 3 with the top flange removed to reveal the hub core and showing the gripper assembly along its insertion path.

In FIG. 4, the upper flange 22 has been removed to reveal the lower flange 24 and the hub core 26. The tape leader pin gripper 120 has been moved along the guide channels including along the guide channel 80 into a position where the end portion 126 and the middle portion 124 have passed through the slot 82 and into the interior of the hub core 26. The hook portion 122 remains outside of the hub core 26 and is thus not yet in the fully inserted position. FIG. 4 shows a snapshot of the gripper assembly 120 as it is being moved along the guide channels; the gripper 120 ordinarily would not stop in the position shown.

The hook portion 122 in the embodiment of FIG. 4 is shown with a tape leader pin 140 engaged in hooks 142 of the hook portion 122. The tape leader pin 140 is secured to the free end of a magnetic recording tape that is stored in a single reel cartridge. The magnetic recording tape that is normally secured to the leader pin 140 is not shown in this figure to facilitate a clearer view and an easier understanding of the relationship between the various parts of the gripper assembly.

The tape leader pin 140 is held in a locked position in the hook portions 142 by a keeper 144 which is mounted on two pivot pins on the gripper hook and biased by the spring 116 (FIG. 3) around the pin 134 that is between the gripper hook portion 122 and the middle portion 124. The keeper 144 moves in the direction opposed by the spring 116, such as by overcoming the spring force, to accept the leader pin 140 in a position engaged into the hook portions 142. The keeper 144 is moved by the spring 116 back into a position to secure the tape leader pin 140 in the hook portions 142. A keeper release 146 is provided on the hook portion 122 and connected to the keeper 144. Activation of the keeper release 146 moves the keeper 144 out of the engaged position and releases the tape leader pin 140 from the hook portions 142. Such release would be utilized when the magnetic recording tape has been wound back onto the storage spool in the single reel cartridge and it is desirable to disengage the tape leader pin gripper 120 from the leader pin 140. A mechanism for releasing the keeper 144 is thereby provided. The release mechanism is not shown but would be well understood by those of ordinary skill in the art from the present description. One possible release mechanism is a cam surface that contacts the keeper release 146 when necessary. It is also envisioned that the keeper release 146 may be operated by the release mechanism or another element to move the keeper 144 to an open position when engaging the leader pin 140.

The pull-in wedge 138 and the pivot pins 134 and 136 are shown inside the central portion of the hub core 26 where they have been guided along the guide channel 80 of the lower flange 24 and similarly along the guide channel 58 of the upper flange 22 (the upper flange 22 has been removed in this view). The guide channels continue into the interior of the hub core 26 and portions of the hub core form extensions of the guide channels for guiding the gripper assembly.

In the illustration of FIG. 4, the pull-in wedge 138 has been moved, compared to the position shown in FIG. 3, along the guide channels to a location just prior to engagement with pull-in rollers 150 and 152 that are mounted on the free ends of the roller arm assembly 84 and 86, respectively. In particular, the roller arm assembly 84 is mounted on the roller arm pin 92 for pivoting movement within the central portion of the hub core 26. The pivoting movement is biased toward the opposing roller arm assembly 86 by the torsion spring 88. In a similar manner, the roller arm assembly 86 is mounted on the roller arm pin 94 for pivoting movement within the central portion of the hub core 26 and is biased to move the pull-in roller 152 toward the pull-in roller 150 by the torsion spring 90.

Movement of the tape leader pin gripper assembly 120 along the guide channels 58 and 80 is accomplished by a mover pin 160 that is part of a mover assembly, which is not shown in this illustration and which may be similar to that shown in the prior U.S. Pat. No. 6,908,055 B2, which is incorporated by reference herein. The mover pin 160 engages into an opening 162 in a mover pin plate 164. The mover pin 160 travels along the slot 60 in the upper flange 22 as it exerts a pull-in force on the tape leader pin gripper 120 to bring the tape leader pin gripper into the central portion of the hub core 26 and alternatively exerts a force on the tape leader pin gripper assembly 120 to draw the gripper assembly out of the central portion of the hub core 26, along the guide channels and out of the take-up reel. The opening 162 is considerably larger than the diameter of the mover pin 160 to prevent binding or jamming of the device during movement.

Figure 5:
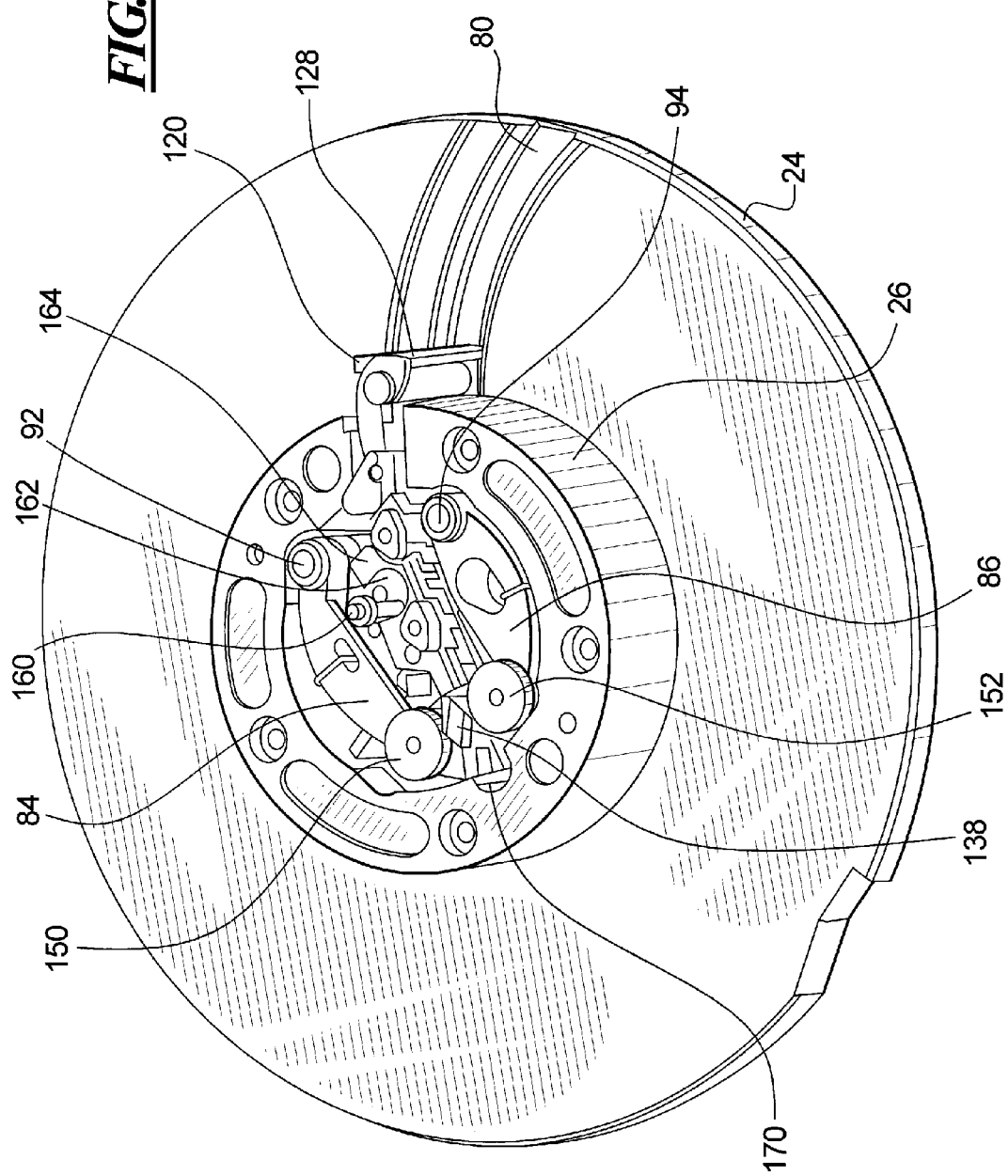
FIG. 5 is a top perspective view of the hub core and lower flange of the take-up reel as shown in FIG. 4 with the gripper assembly further along its insertion path.

In FIG. 5, the take-up reel is shown without the upper flange 22 similar to FIG. 4 and the tape leader pin gripper assembly 120 has been moved further along the guide channel 80 so that it is nearly completely within the interior space of the core hub 26. Specifically, the mover pin 160 has been moved to push against the edges of the opening 162 of the mover plate 164 so that the pull-in wedge 138 is pressed against the pull-in rollers 150 and 152. The pull-in wedge 138 is wedge-shaped so that it pushes the rollers 150 and 152 apart as the result of pivoting of the swivel arms 84 and 86 about the roller arm pins 92 and 94. During the pull-in of the pull-in wedge 138 between the rollers 150 and 152, the rollers rotate as the roller arms 84 and 86 move apart due to the pull-in wedge 138 forcing the rollers 150 and 152 apart. The force required to draw the pin gripper assembly 120 into the hub core 26 reaches its maximum at or about the widest point of the pull-in wedge 138, as shown in FIG. 5. The pull-in force required to pull the gripper into the hub decreases after the maximum force position, providing a type of over-center engagement of the gripper in the hub. At the maximum spaced position of the roller arms, the pull-in wedge 138 has not yet fully reached a wedge receptacle space 170 in the wall of the hub core 26. In this position also, the end face 128 of the tape leader pin gripper assembly 120 still extends radially outward from the outer surface of the hub core 26 so that an even tape wrapping surface is not yet formed.

Figure 6:
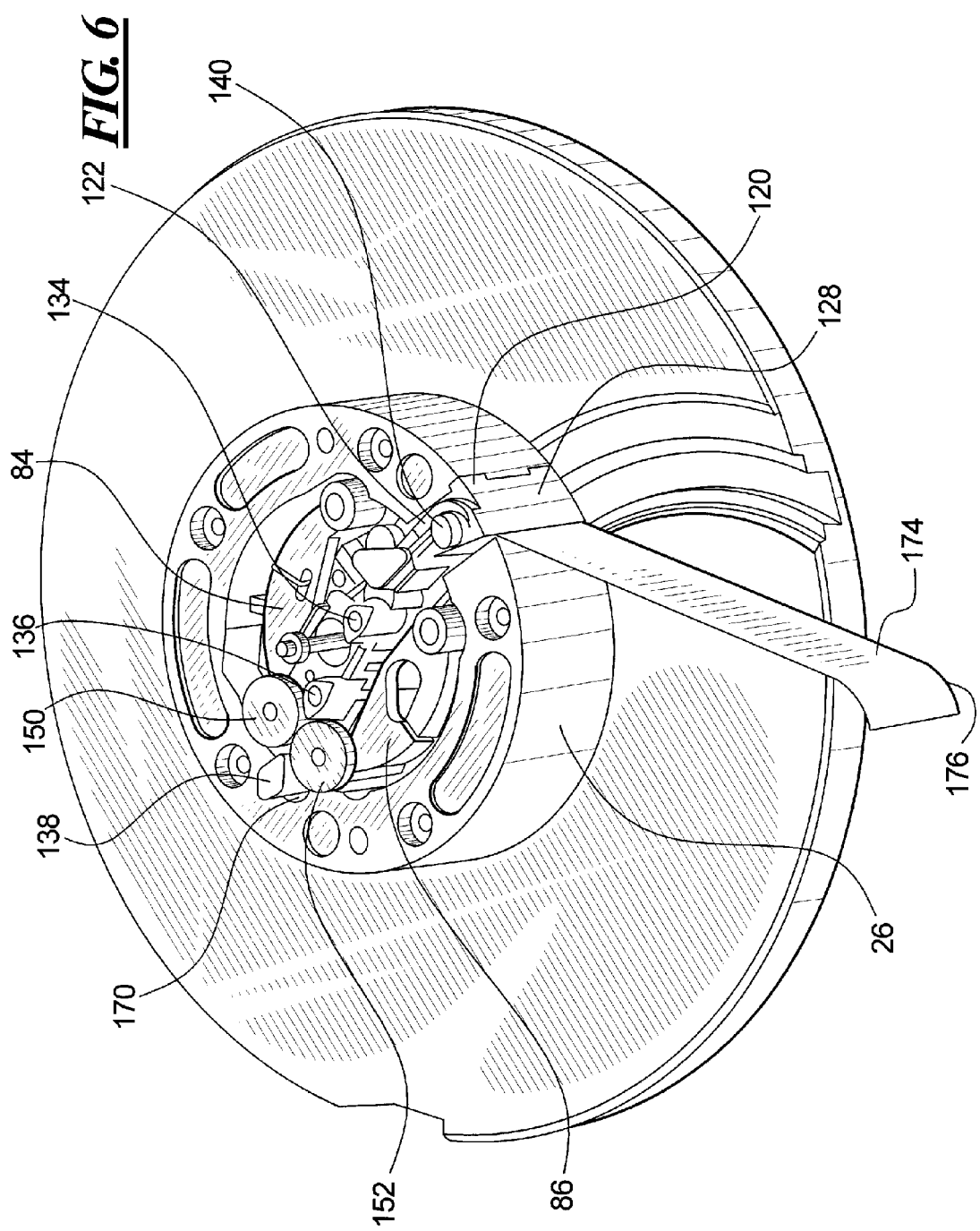
FIG. 6 is a top perspective view of the lower flange and hub core of the take-up reel with the gripper assembly in a fully inserted position and showing the tape leader extending from the gripper assembly.

The movement of the tape leader pin gripper 120 into the hub core 26 has been continued in FIG. 6 so that the outer surface 128 of the hook portion 122 lies flush with the outer surface of the hub core 26. In this view, the leader 174 of the magnetic recording tape 176 is shown in the drawing. In the preceding drawings, the leader 174 and tape 176, although present in the real world device, was not shown so that the relative positions of the other components could be more easily seen in the illustration. The outer surface 128 forms a completion of the cylindrical surface of the center hub 26 so that the magnetic tape may wind thereon without bumps, distortions, depressions, gaps or other variations which would impact the movement of the magnetic recording tape in the recording and playback apparatus.

The further movement of the tape leader pin gripper assembly 120 to the predetermined fully inserted position results in the pull-in wedge 138 passing completely between the rollers 150 and 152 and into the pull-in wedge receptacle 170. As the pull-in wedge 138 moves beyond the maximum spacing of the rollers 150 and 152 caused by the widest point of the pull-in wedge 138, the spring action of the roller arms 84 and 86 pressing toward one another squeezes the rollers 150 and 152 on the wedge-shaped second portion of the pull-in wedge 138 to force the pull-in wedge 138 from between the rollers and draw the tape leader pin gripper completely into the hub core 26. This acts as an over-center type fastener to urge the gripper assembly 120 to the desired position and hold the gripper assembly 120 in place.

Any tension on the magnetic recording tape 176 caused by the initial winding of the magnetic recording tape onto the hub core 26 would tend to pull the tape leader pin gripper 120 from the hub core 26. However, such force is opposed by the spring force of the roller arms 84 and 86 and so this spring force of the roller arms prevents the pull-in wedge 138 from being drawn between the rollers 150 and 152 and thus prevents the tape leader pin gripper 120 from being pulled from the hub core 26. Thus, the pull-in wedge 138 and roller arms 84 and 86 not only seat the gripper assembly 120 in place but also resist it being pulled out of place during the start of tape winding, a critical time for ensuring that the tape winding surface of the hub has no variations from the ideal shape.

As can be seen in FIG. 6, the tape leader pin 140 has been pulled into the interior of the hub core 26 when the tape leader pin gripper assembly 120 is in the fully inserted position.

When the gripper assembly 120 is in this position, the pivot pins 134 and 136 and the end caps thereon have not passed between the rollers 150 and 152; only the pull-in wedge 138 passes between the rollers 150 and 152 even when the gripper assembly 120 is fully inserted.

Figure 7:
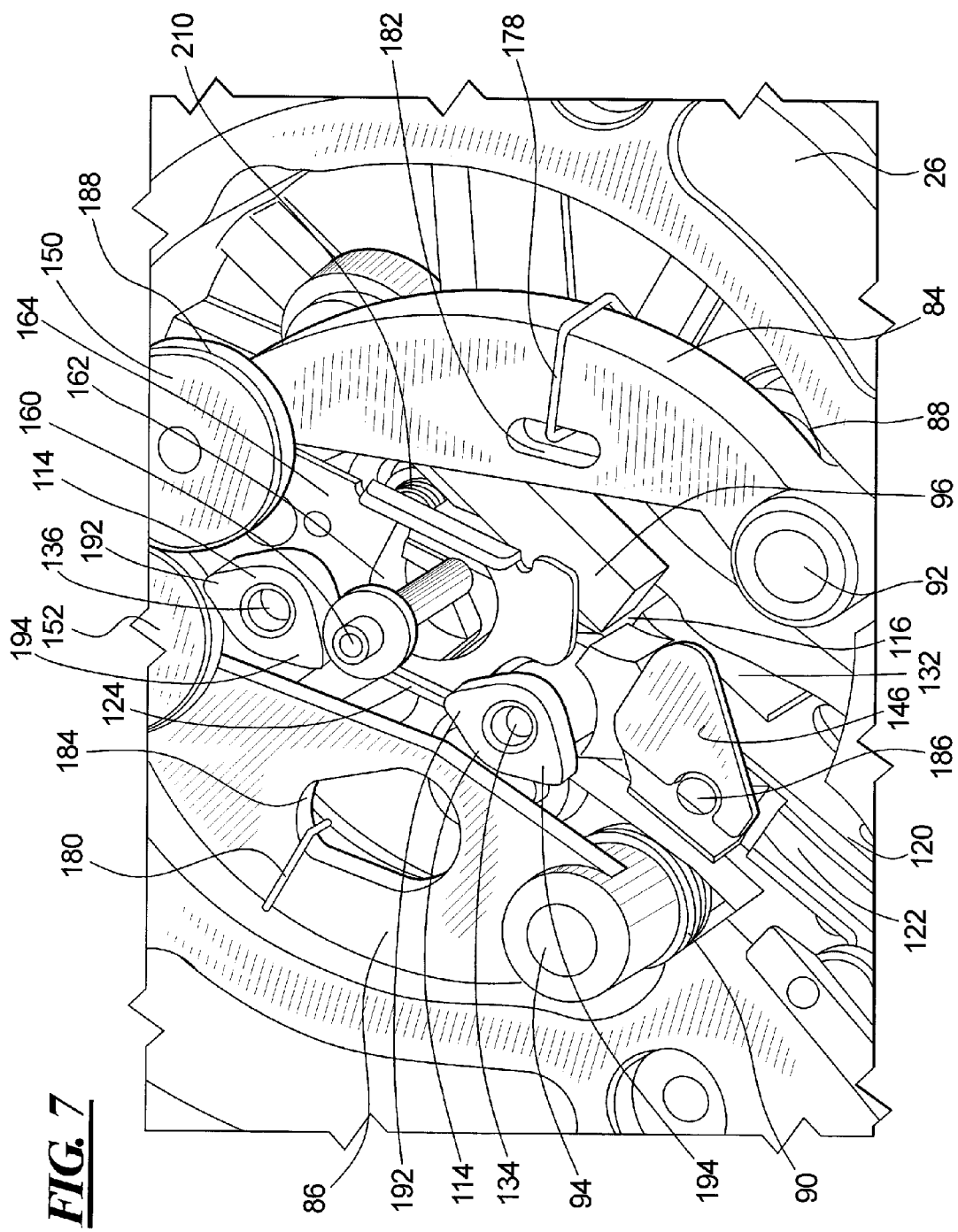
FIG. 7 is an enlarged perspective view of a central portion of the hub core with the top flange removed and showing the gripper assembly in a fully inserted position between the roller arms.

With reference to the enlarged view of FIG. 7, the tape leader pin gripper 120 is shown in the fully inserted position within the interior of the hub core 26. The rollers 150 and 152 are in contact with one another or at least nearly so as the result of the spring force of the springs 88 and 90 on the roller arm pins 92 and 94 that act on the roller arms 84 and 86, respectively. The springs 88 and 90 engage the roller arms 84 and 86 by spring extensions 178 and 180 that engage into openings 182 and 184.

Details of the tape leader pin gripper assembly 120 are also shown in FIG. 7 including the keeper spring release 146 that is ramp-shaped or triangular-shaped to engage a corresponding release mechanism or part, such as in the tape drive device and thereby move the keeper spring 144 so as to release the tape leader pin 140. (See FIG. 4). The keeper spring release 146 pivots about a pivot pin 186 on the hook portion 122 between a leader pin keeping position and a leader pin release (or acquisition) position.

The plate magnet 132 that is secured in the hook portion 122 comes into magnetic engagement with the magnet 96 in the hub core 26 when the gripper assembly 120 is in the fully inserted position. It is also possible that the magnetic engagement occurs prior to the gripper 120 reaching the fully inserted position so that the magnetic force provides an additional force for pulling the gripper assembly into place and keeping it there. The magnetic engagement of the plate magnet 122 with the magnet 96 may be as a result of the two magnets coming into physical contact but preferably it is, as illustrated in FIG. 7, the result of the two magnets being spaced apart by a small gap. This way, the position of the gripper assembly 120 in the hub 26 is defined solely by reference surfaces in contact with one another and not by contact between the magnets. The magnetic force between the two magnets 132 and 96 provides further resistance to forces attempting to pull the tape leader pin gripper 120 from the hub core 26. As noted above, only one of the elements 132 and 96 needs to be a magnet.

The mover pin 160 is shown in the opening 162 of the mover plate 164. The opening 162 in the mover plate 164 is of a substantially greater diameter than the mover pin 160. This permits the mover pin 160 to move the tape leader pin gripper 120 along its movement path with a reduced chance of binding or otherwise obstructing movement of the tape leader pin gripper 120. The mover plate 162 is formed in a preferred embodiment of sheet metal into which an opening has been formed to provide the movement opening 162. An outer edge of the opening is turned up in a flange 188. The mover plate 164 is affixed to the middle portion 124 of the tape leader pin gripper 120.

The hook portion 122 and the middle portion 124 are pivotably connected to one another by the pivot pin 134. The pivot pin 134 has mounted therearound the coil spring 116 to bias the pivoting movement of the hook portion 122 and middle portion 124 relative to one another and aid in guiding of the tape leader pin gripper 120 along the tape path. The pivot pin 134 includes the end cap or track follower 114 at the end thereof, and may include a second comparable end cap or track follower at the opposite end thereof. The track follower 114 is shaped with directional wedge portions extending in the travel direction of the tape leader pin gripper 120 to facilitate guiding of the tape leader pin gripper along the guide channels and tape flow path. The track follower 114 of a preferred embodiment includes bevels or ramps 192 and 194 to facilitate movement of the end cap under the leaf spring ramp (as will be described hereinafter).

The middle portion 124 of the gripper assembly is connected to the end portion 126 (see FIG. 3) by the pivot pin 136. The pivot pin 136 includes the coil spring 210 which biases the middle portion 124 relative to the end portion 126 to facilitate movement of the tape leader pin gripper 120 along the tape flow path and into the guide channels. Similar to the previous pivot pin 134, the pivot pin 136 includes an end cap or track follower 114 having directional wedge-shaped portions extending in opposite directions and bevels 192 and 194 at the top edge of each wedge shaped portion.

The load sequence of the tape leader pin gripper as described in the foregoing is performed while the magnetic recording tape is slightly tensioned, although this need not always be so. When the tape leader pin gripper 120 is pulled into the hub core 26 and the rollers 150 and 152 are moved beyond the widest part of the pull-in wedge, the direction of the force will shift. The tape leader pin gripper 120 is pulled in by the roller and wedge force. The mover pin 160 will stop in the center position of the hub core 26 once it has moved the pin gripper far enough that it is passed the force direction shift. The mover plate 164 may remain in contact with the mover pin 160 in some embodiments, but in other embodiments the mover pin 160 is in a position entirely out of contact with the mover plate when the pin gripper 120 in the fully inserted position. In the illustration of FIG. 7, the mover pin 160 and mover plate 164 are out of contact with one another. The distance between the mover pin 160 and mover plate 164 when the pin is in its stopped or fully inserted position is defined by a distance C1.

The magnetic force exerted by the magnet 96 and the plate magnet 132 (both of which may be magnetic or only one of which may be magnetic) on each other aid in holding the pin gripper 120 in the fully inserted position. This magnetic force is at a maximum when the distance between the two magnetic elements is at a minimum. The pin gripper 120 preferably reaches its fully inserted position and is stopped at a position with the magnetic elements spaced from one another by a gap. The gap between the magnetic elements is at a minimum when two reference surfaces on the gripper portion 122 engage mating reference surfaces and a reference stop in the hub core 26, as will be described hereinafter. The rollers may exert a pull-in force on the pull-in wedge once the pin gripper 120 has reached the fully inserted position shown in FIG. 6 or in an alternate embodiment the pull-in wedge may have moved past the rollers so that the rollers no longer exert a pull-in force on the pull-in wedge after the fully inserted position is reached.

With the tape leader pin gripper 120 fully seated in position in the hub core 26, a minimum of irregularities are present on the hub core tape surface. The force of the two magnetic elements attracting one another has sufficient margins to withstand the tape tension forces as the first layers of tape are wound onto the hub core. The magnetic force may account for a majority of the force to counteract the tension by the tape during initiation of winding, or it may account for only a smaller additional force. The magnetic force does, however, reduce or eliminate the amount of play that may be present in other, particularly other mechanical, latching mechanisms to thereby provide a defined position of the gripper.

Figure 8:
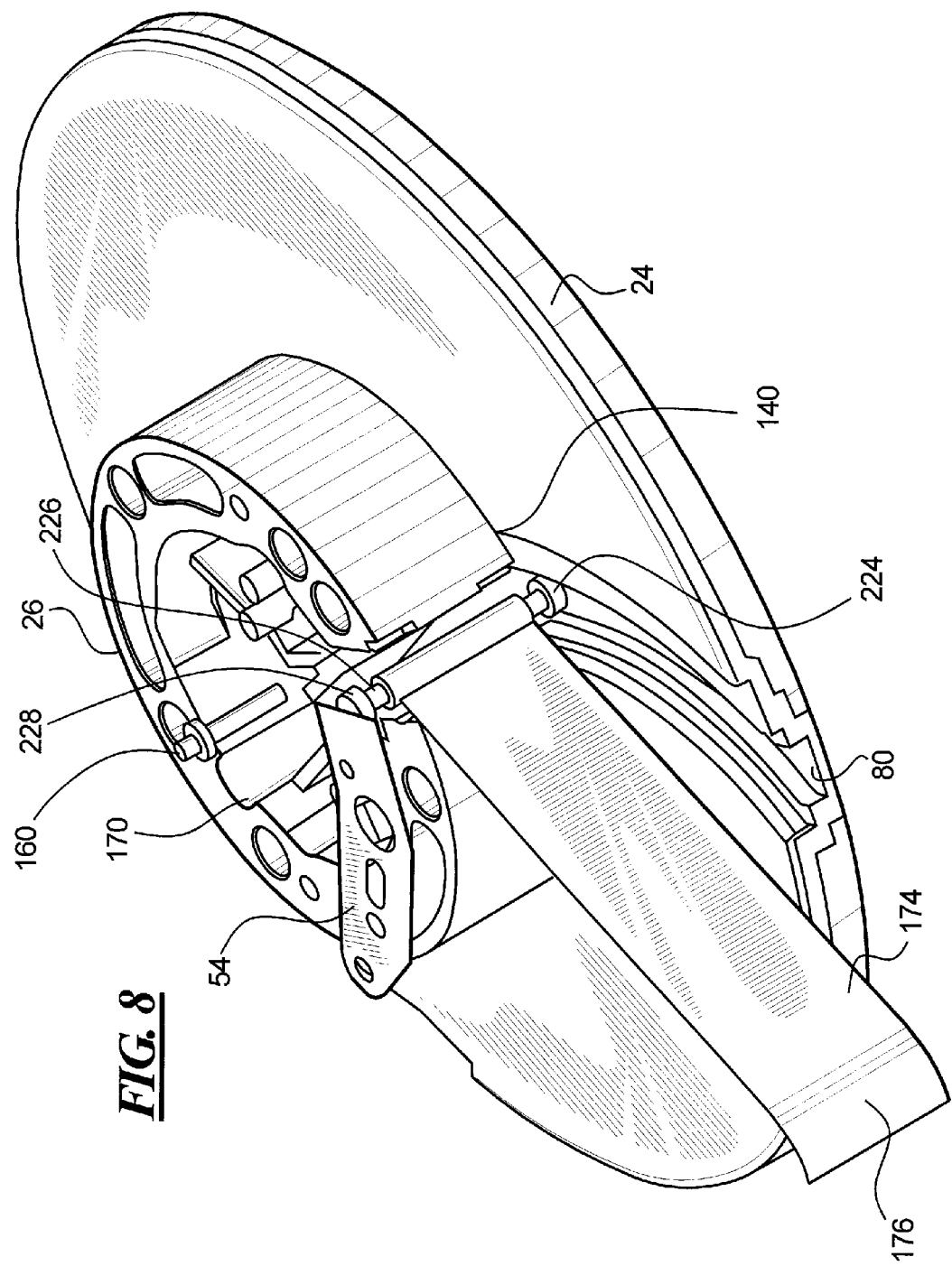
FIG. 8 is a perspective view of the lower flange and hub core of the take-up reel according to the principles of the present invention including a leader pin positioning spring.

Turning now to FIG. 8, the lower flange 24 and the hub core 26 are shown with the top flange 22 as well as the tape leader pin gripper 120 removed but positioned as if the pin gripper 120 where holding it in place. In this view, the tape leader pin 140 is shown on the tape leader 174 of the magnetic recording tape 176. The tape leader pin 140 has grooves 224 and 226 into which the hooks 142 of the hook portion 122 (see FIG. 4) engage. The tape leader pin 140 rides in the guide channel 80 in the lower flange 24 and in a similar manner also rides in the guide channel 58 of the upper flange 22 (see FIG. 3). When the tape leader pin gripper 120 has reached its fully inserted position, it pulls the tape leader pin 140 into position beneath the leaf spring 54.

The leaf spring 54 includes a ramp portion at 228 at the free end of the leaf spring 54. The ramp portion 228 is a sloped or angled end, preferably with an additional plastic add-on part, on the leaf spring 54. The underside surface of the ramp portion 228 slides over the tape leader pin and flexes the spring 54. When the tape leader pin 140 is pulled under the leaf spring, it slides under the ramp 228 where the leaf spring 154 presses down on the leader pin 140 to press it into a predefined position in the guide channel 80. As a result of the pressing force by the leaf spring 54, the position of the leader pin 140 in the hub is defined precisely and the shifting of the leader pin 140 is reduced or eliminated so that wrinkles and distortions in the tape leader are eliminated during winding. By using the leaf spring 154 to define the position of the leader pin 140, the guide channel can be formed larger and wider to provide to have greater dimensions relative to the leader pin and thereby enable the leader pin 140 to move freely through the guide channel 80 without binding. It is not necessary that the guide channel 80 be manufactured with tight spacing to provide and maintain a fixed and predetermined position of the pin 140 in its fully inserted position.

The ramp 228 on the leaf spring 54 is in a position so that the pivot pins 134 and 136 and pull-in wedge 138 pass under the ramp 170 as the pin gripper moves into and out of the fully inserted position. For this reason, the pull-in wedge 138 and the pivot pin end caps 114 are beveled at 192 and 194 to facilitate ready passage under the ramp 170.

The slide ramp 228 on the leaf spring 54 is of a plastic or other low friction material and is mounted by plastic welding of a pin onto the metal leaf spring. The leaf spring 54 is mounted by plastic welding of pins on the upper flange 22 which extend through openings in the metal leaf spring. The leader pin 140 rests in the guide track 80 with precision dimensions and tolerances relative to the width of the tape contact surface on the hub core. As the tape leader pin is held in place and winding of the tape is commenced, it is very important that the tape exit from the hub in a well-aligned position relative to the tape contact surface on the hub core 26. A misalignment in the leader pin 140 will create different transversal tensions in the tape when it is wrapped over the corner at the exit of the hub core slot. This transversal tape tension difference will last for many layers of tape and create and unwanted lateral tape movement, which are avoided in the present apparatus.

The mover pin 160 is shown in the view of FIG. 8 in the center position of the take-up reel. The mover pin 160 in the preferred embodiment is not a component of the tape leader pin gripper, but represents an outside element that is operated by the tape drive to move the tape leader pin gripper along its path, both into and out of the inserted position.

Turning now to FIG. 9, the hub core 26 includes the metal insert 104 that fits into or is positioned inside the plastic over-molding 106. The plastic over-molding 106 may be molded onto the metal insert 104 so that the two are bonded together. The metal insert 104 includes a ring-shaped outer wall 236 and a central floor 238, which serves as a reference surface. The perimeter ring 236 extends above the floor 238 by a setback 240 that includes notches 242 and semicircular recesses 244. The plastic over-molding 106 includes a space 246 for receiving the ring-shaped portion 236 and has projections 248 that fit into the notches 242 and over-molded plastic portions 250 that fill the semicircular recesses 244. Posts 252 fit into openings 254 in the floor 238 of the metal insert 104. The floor 238 extends through the opening 70 (see FIG. 2) of the lower flange 24. Openings or recesses 256, three of which are shown, are used for fine tuning the center of gravity of the complete hub with the gripper assembly included. For example, weight may be removed selectively via the openings by removing portions of the posts 252 as needed. This permits the hub to rotate without vibrations. A recess is provided on the opposite side for alignment of the core part in the mold tool in the plastic over-molding process. A central opening 258 corresponds with the rotation axis 260 of the plastic over-molding 106 which is aligned with the drive axis of the take-up reel.

The guide channel for guiding the tape leader pin gripper into the interior of the hub core 26 includes a guide channel portion 262 that is in communication with the slot 82. The metal insert 104 has an opening 264 to accommodate the slot 82 in the over-molded part.

The metal core and plastic over-molding provides a hub core 26 which is sufficiently rigid to withstand forces created by many layers of tape wound thereon. The hub core 26 is a rigid and dimensioned stable material and has a precision surface which is used as a mounting surface against which the hub motor is mounted. The plastic over-molding provides the tape contact surface as well as providing the surfaces for mounting the flanges and a guide pin for the motor mount is also included in this over-molding. The injection molding pressure creates a high force against the insert and presses the motor mount surface firmly against the reference wall of the mold. The hub core motor mount surface in the tape contact area and the mounting surfaces for the hub flanges and the guide pin for the motor mount can be made with tight tolerances in one molding operation.

Reference surfaces 270 and 272 are provided at the slot 82 in the hub. These reference surfaces 270 and 272 provide a defined location for contact with corresponding reference surfaces of the pin gripper when the gripper is in its fully inserted position.

Figure 10:
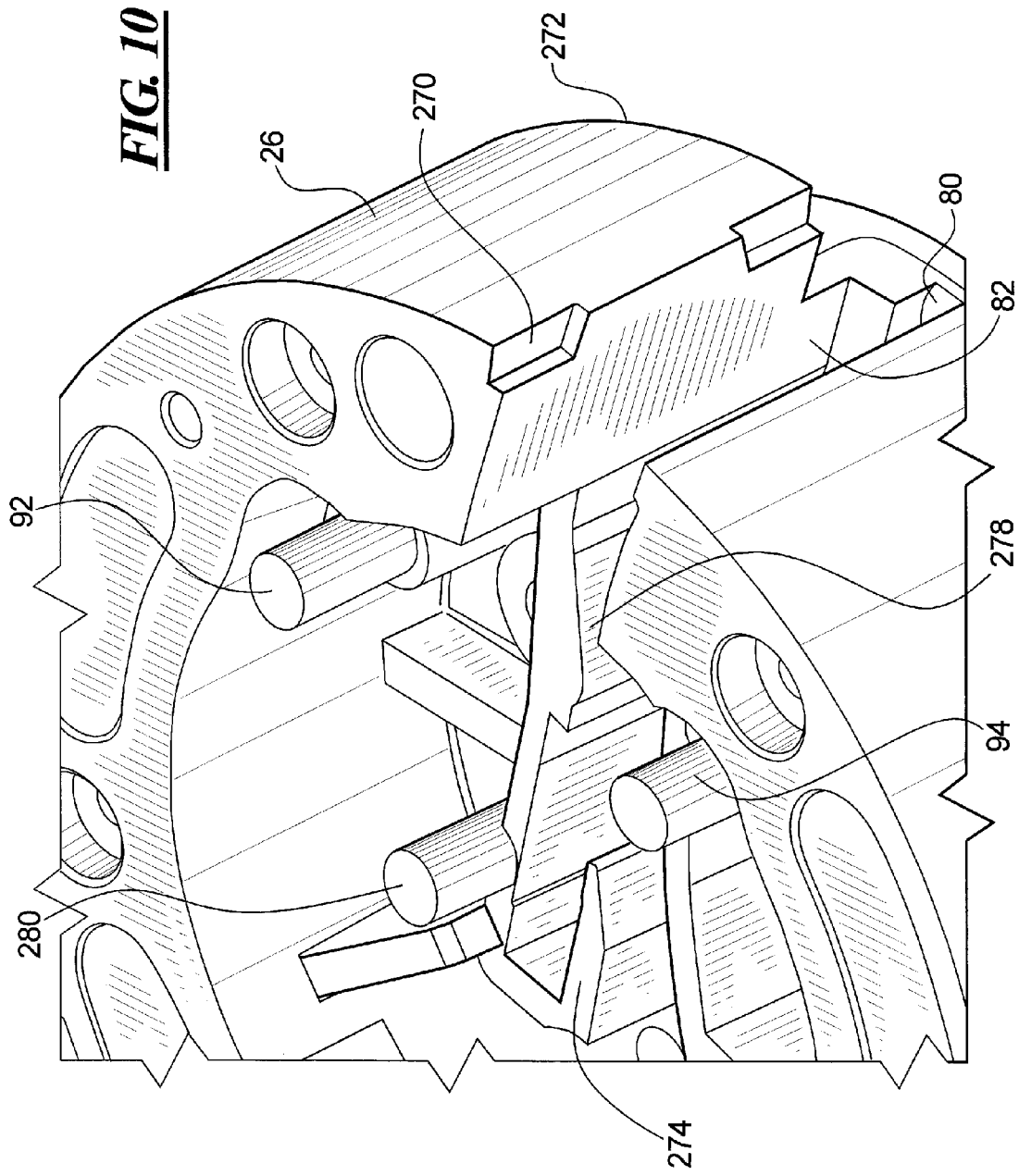
FIG. 10 is an enlarged perspective view showing a portion of the hub core of the take-up reel including reference surfaces for contact with the gripper assembly.

FIG. 10 provides a close-up view of the reference surfaces 270 and 272 at the slot 82. The reference surfaces 270 and 272 are recessed from the outer surface of the hub core 26. At the lower portion of the slot 82 is the guide channel 80 at which the lower end of the tape leader pin 140 passes on its way into and out of the hub.

Within the interior of the hub core 26 is a groove 274 in the plastic part for holding the magnet 96 (which is removed in this view). The magnet 96 is held in the groove 274 by glue, for example. A ramp 278 is provided in the guide channel 80 inside the hub core 26 for contact with a cam element in the hook portion to ensure that the reference surfaces 270 and 272 are engaged by the hook portion. The roller arm pins 92 and 94 are shown without the roller arms thereon. The further post 280 in the interior of the hub core 26 blocks overextension of the roller arms.

Figure 11:
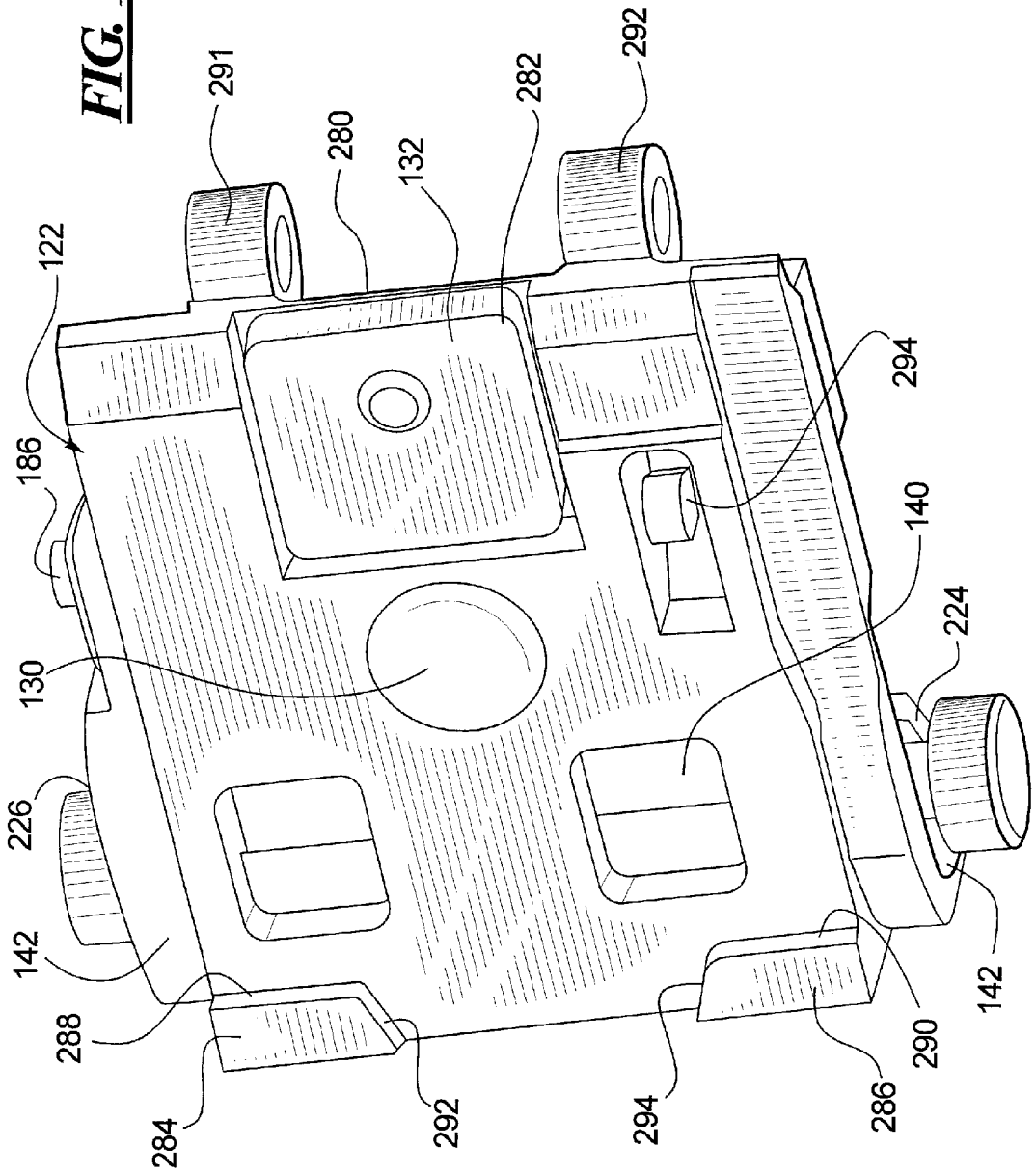
FIG. 11 is an enlarged perspective view of a gripper hook portion of the gripper assembly including seating surfaces for contact with the references surfaces of the hub and a magnetic plate.

FIG. 11 shows the hook portion 122 for engagement with the tape leader pin. The hook portion includes the plate magnet 132 in a recess 282. A pin 280 is part of the gripper hook and the top of the pin 280 serves as a rotational reference surface for the gripper hook. During insertion, the gripper hook's reference surfaces 288 and 290 on respective projections 284 and 286 hit the mating reference surfaces 270 and 272 of the hub core. A slight magnetic force will then rotate the gripper hook until the surface of the pin 280 hits the reference surface 278, for example at the top of the curve. The slopes 292 and 294 on the gripper hook relative to the mating slopes on the hub core define the position in the z axis. As a result, the gripper is precisely aligned relative to the hub core. The projection 130 is a mold injection gate only that is lowered into the material in order to be sure that there is no protrusion outside the pin 280 reference surface. In the preferred embodiment, the plate 132 is fixed by glue.

The tape leader pin 140 is shown hooked in the hook portions 142 engaged into the grooves 224 and 226. As noted in the foregoing, the keeper holds the tape leader pin 140 in the hooks.

The pivot pin 134 extends through hinge portions 291 and 292 and the spring 190 (see FIG. 7) engages on spring catch 294. The spring biases the position of the pivoting portions of the gripper assembly to enable it to move along the tape guide path with a defined position, thereby avoiding binding and jamming. The pivot knob 186 for the keeper spring is shown at the top of the hook portion.

Figure 12:
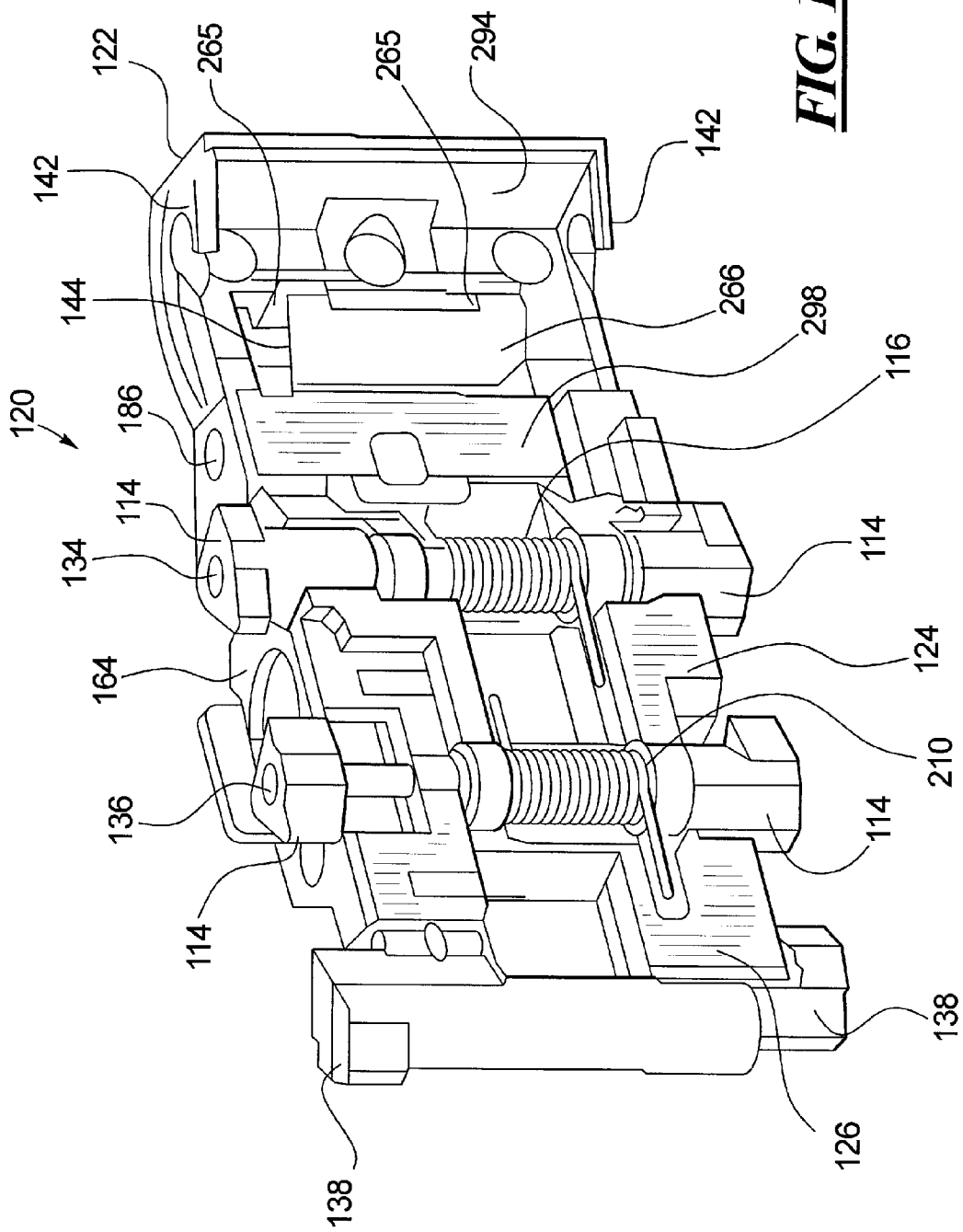
FIG. 12 is a perspective view of the gripper assembly shown from the hook side.

FIG. 12 shows a view of the tape leader pin gripper 120 with the hook portion 122, middle portion 124, and the end portion 126. The hook portion 122 has an outer end face. At the opposite edges, corresponding to the top and bottom of the portion 122 in the FIG. 12, are first and second hooks 142 that fit into grooves in the leader pin 140. Between the hooks 142 is a recess 294 into which the middle portion of the leader pin fits. The recess contains the pin keeper 144. The pin keeper 144 has two spaced fingers 265 that are curved and flexible to press against the leader pin 140 to move the leader into position and to hold it there. Openings are provided in the hook portion 122 to accommodate movement of the fingers as the pin keeper 144 is moved between the pin keeping position and the pin release position. The fingers extend from a hand 296, which in turn extends from a cross member 298. The cross member 298 has ends that are formed to engage the pivot projections 186 of the hook portion for pivoting movement of the pin keeper 144 so that it can be pivoted between a pin locking position and a pin releasing position. In the illustrated embodiment, the top end of the cross member 298 has an extension on the formed end that provides the release for the pin keeper.

The pin keeper 144 is biased to the pin retaining position by the bias spring 116. The bias spring 116 is mounted in the pivot pin 134 that hingedly fastens the hook portion 122 to the middle portion 124. The same spring 116 also biases the hook portion 122 relative to the middle portion 124. In other words, the torsion spring 116 between the two end elements, the hook portion and the middle portion, helps to bias the parts of the gripper assembly to better follow the tape path. This same torsion spring 116 also performs the additional function, namely to bias the pin keeper 144 to the pin gripping position. This torsion spring 116 enables the pin keeper 144 to hold onto the leader pin 140 as the gripper assembly is moved along the tape path. The torsion spring 116 between the hook portion 120 and the middle portion 122 is also important to bias the pin gripper as the leader pin is engaged and when it is released from the engaged condition. The caps 114 are provided on each end of the pivot pin 134.

In FIG. 12 can also be seen the second pivot pin 136 of the gripper assembly 120 with its torsion spring 210. The pivot pin 136 likewise has end caps 114. The pull in wedge 138 is show at the end of the end portion 126. This wedge is the leading end when the gripper assembly is being moved to thread the tape leader into the take up spool. The mover plate 164 is visible at the top of the middle portion 124.

Figure 13:
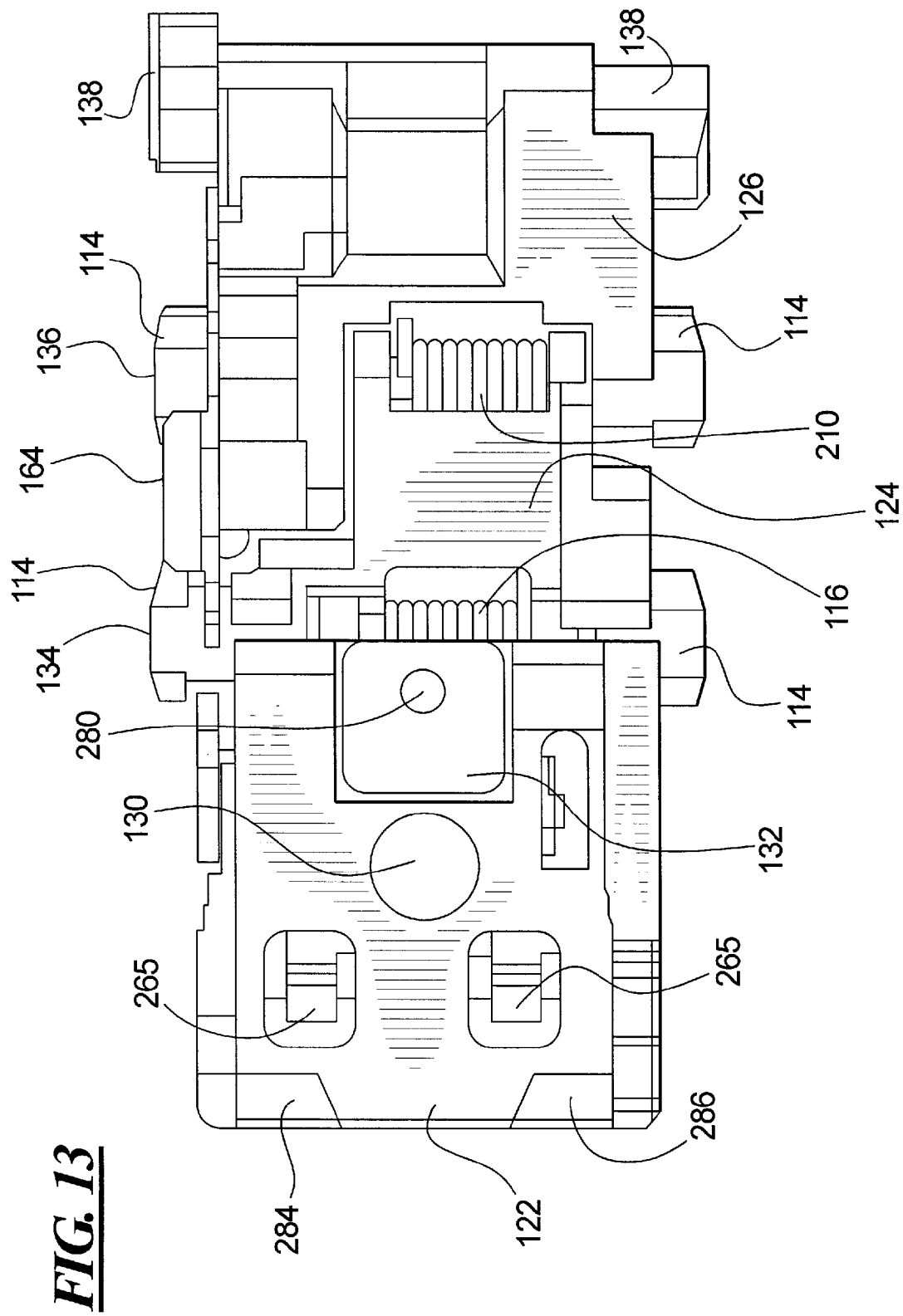
FIG. 13 is a side elevational view of the gripper assembly shown from the side opposite the hooks.

FIG. 13 provides a view of the gripper assembly 120 from the back. As noted above, the hook portion 122 has projections 284 and 286, a magnetic plate 132 and a pin 280. Openings are provided for clearance of the fingers 265 of the keeper. The spring 116 between the hook portion 122 and the middle portion 124 is on the pin 134, at the end of which is an end cap 114. The mover plate 164 engages the mover pin to permit guiding movement of the gripper assembly 120. The spring 210 is between the middle portion and the end portion 126. The pull in wedge 138 is at the leading end of the end portion 126 (during pull in, or at the trailing end during removal).

In FIG. 14, the gripper assembly 120 is shown in exploded view, including the keeper 144 and a spring release 146, the hook portion 122, the middle portion 124, and the pivot pins 134 and 136. The end portion 126 is shown with the mover plate 164 that is held thereon by a fastener 300. The end caps 114 are shown formed in one piece with the middle portion 124 and end portion 126 respectively, whereby the pivot pins 134 and 136 fit into openings in the top end cap 114.

Thus, there is shown and described a tape leader pin gripper and take up reel for a single reel cartridge drive which includes multiple features to ensure movement of the parts without jamming and accurate positioning of the tape during winding. Spring biased arms with rollers at the ends thereof engage a pull-in wedge to provide a pull-in force on the leader pin gripper and counter forces that would tend to pull the tape end out of position in the take up reel. A magnet exerts an additional force to counteract the tape tension during start of winding. Reference surfaces provide precise alignment of the gripper in the hub and ramp or cam surfaces ensure that the reference surface come into contact with one another. The mover pin and mover plate are formed to permit play therebetween while enabling movement of the gripper without binding. A leaf spring is provided to press the leader pin into a predetermined position to reduce distortion of the tape during winding.

Although other modifications and changes may be suggested by those skilled in the art, it is the intention of the inventors to embody within the patent warranted hereon all changes and modifications as reasonably and properly come within the scope of their contribution to the art.

We claim:

1. A take-up reel for a single reel cartridge magnetic tape drive, said single reel cartridge including a magnetic tape on a reel, said magnetic tape including a leader pin at a free end, comprising:
   a first flange and a second flange spaced from one another to define a tape winding space therebetween;
   a central hub mounted between said first and second flanges, said central hub having a substantially cylindrical wall, said cylindrical wall defining a gripper space;
   a leader pin gripper selectively receivable in said gripper space, said leader pin gripper including a hook portion having a hook for selective engagement with the leader pin of the magnetic tape; and
   an alignment spring mounted at said central hub, said alignment spring contacting the leader pin when the leader pin is engaged in said hook portion of said leader pin gripper and said leader pin gripper is in said gripper space, said alignment spring pressing the leader pin in an axial direction.

2. A take-up reel as claimed in claim 1, further comprising:
   a slide ramp on a free end of said alignment spring, said slide ramp being in contact with the leader pin when said leader pin is in said hook portion and said leader pin gripper is in said gripper space.

3. A take-up reel as claimed in claim 1, wherein said alignment spring is a leaf spring fastened at said central hub.

4. A take-up reel as claimed in claim 1, wherein said first and second flanges define guide channels, said guide channels extending from a perimeter of said first and second flanges to said gripper space of said central hub, said guide channels guiding the leader pin during movement of the leader pin gripper to said gripper space, said alignment spring pressing the leader pin into at least one of said guide channels when said leader pin gripper is in said gripper space.

5. A take-up reel as claimed in claim 1, wherein said central hub defines an interior space, said cylindrical wall defining a slot open to said interior space, said gripper space being in said interior space at said slot, said alignment spring having said free end for contact with the leader pin substantially adjacent said slot.

6. A take-up reel as claimed in claim 1, wherein said first flange includes a first guide channel extending from an outer edge of said first flange to said gripper space, said second flange including a second guide channel extending from said outer edge of said second flange to said slot in said hub core, said second guide channel being disposed opposite said first guide channel, said second flange includes a guide slot extending substantially parallel to said second guide channel, said alignment spring being mounted at said second guide channel.

7. A take-up reel as claimed in claim 1, wherein said alignment spring is a leaf spring having a first portion affixed to one of said first and second flanges at said central hub and a second portion disposed at a guide channel in said one of said first and second flanges.

8. A take-up reel as claimed in claim 1, wherein said leader pin gripper includes a first portion and a second portion connected to one another by a hinge pin, said hinge pin including a track follower element at an end thereof, said track follower element being contacted by said alignment spring during movement of said leader pin gripper into said gripper space.

9. A take-up reel as claimed in claim 1, wherein said leader pin gripper includes a track follower element, said track follower element being contacted by said alignment spring during movement of said leader pin gripper into said gripper space.

10. A take-up reel as claimed in claim 1, wherein said central hub defines an interior space, said cylindrical wall defining a slot open to said interior space, said gripper space being in said interior space at said slot, said leader pin gripper having first reference surfaces, said cylindrical wall at said slot having second reference surface for contact with said first reference surfaces when said leader pin gripper is in said slot so as to position said leader pin gripper in a predetermined position.

11. A take-up reel as claimed in claim 10, further comprising:
 a cam surface at said slot; and
 a cam follower on said leader pin gripper for contact with said cam surface during insertion of said leader pin gripper into said slot, the contact of said cam follower with said cam surface resulting in said first and second reference surfaces being brought into contact with one another.

12. A take-up reel as claimed in claim 10, wherein said first and second reference surfaces include surface portions substantially parallel to an axis of the leader pin when the leader pin is in the hook portion of the leader pin gripper.

* * * * *